US 8,813,201 B2

(12) United States Patent
Lambert et al.

(10) Patent No.: US 8,813,201 B2
(45) Date of Patent: Aug. 19, 2014

(54) GENERATING SECURITY MATERIAL

(75) Inventors: Paul A. Lambert, Mountain View, CA (US); Yong Liu, Santa Clara, CA (US)

(73) Assignee: Marvell World Trader Ltd. (BB)

( * ) Notice: Subject to any disclaimer, the term of this patent is extended or adjusted under 35 U.S.C. 154(b) by 612 days.

(21) Appl. No.: 12/795,994

(22) Filed: Jun. 8, 2010

(65) Prior Publication Data

US 2010/0333185 A1 Dec. 30, 2010

Related U.S. Application Data

(60) Provisional application No. 61/219,928, filed on Jun. 24, 2009, provisional application No. 61/223,974, filed on Jul. 8, 2009.

(51) Int. Cl.
| | |
|---|---|
| *G06F 21/20* | (2006.01) |
| *H04L 9/08* | (2006.01) |
| *H04L 29/06* | (2006.01) |
| *H04W 12/04* | (2009.01) |
| *H04W 84/04* | (2009.01) |

(52) U.S. Cl.
CPC ............ *H04L 9/0833* (2013.01); *H04L 63/062* (2013.01); *H04L 63/065* (2013.01); *H04W 12/04* (2013.01); *H04L 63/0892* (2013.01); *H04W 84/045* (2013.01)
USPC .......................................................... 726/6

(58) Field of Classification Search
CPC .. H04W 12/04; H04W 84/045; H04L 9/0833; H04L 63/062; H04L 63/065; H04L 63/0892
USPC .......................................................... 726/6
See application file for complete search history.

(56) References Cited

U.S. PATENT DOCUMENTS

| 7,477,746 B2* | 1/2009 | Kang et al. ............... 380/270 |
| 2006/0083200 A1* | 4/2006 | Emeott et al. ............ 370/331 |
| 2007/0192832 A1* | 8/2007 | Qi et al. ..................... 726/3 |
| 2008/0016350 A1* | 1/2008 | Braskich et al. .......... 713/169 |

FOREIGN PATENT DOCUMENTS

| WO | 2007/111710 A2 | 10/2007 |
| WO | 2008/019942 A1 | 2/2008 |
| WO | 2008/112455 A2 | 9/2008 |

OTHER PUBLICATIONS

Winget, TGi Draft Comments 5.0, Aug. 2003, IEEE 802.11-03/657r0.*

(Continued)

*Primary Examiner* — Peter Shaw

(57) ABSTRACT

An apparatus and method establish a secure, direct, station-to-station communication between a first station and a second station in a topology (e.g., PBSS) having a central secret holder/provider that allows secure, direct, station-to-station communications and that allows secure station-to-station broadcast communications. The first station and the second station will have previously established a security association (SA) with a topology control point (PCP). The method includes creating pair-wise unique material for the first station. The pair-wise unique material is computed as a function of (i) a known shared secret associated with the PCP, (ii) a first piece of unique data associated with the first station, and (iii) a second piece of unique data associated with the second station. The method includes securely communicating the pair-wise unique material from the first station to the second station.

11 Claims, 9 Drawing Sheets

(56) References Cited

OTHER PUBLICATIONS

Information technology—Telecommunications and information exchange between systems—Local and metropolitan area networks—Specific requirements—Part 11: Wireless LAN Medium Access Control (MAC) and Physical Layer (PHY) specifications, ANSI/IEEE Std 802.11, 1999, Institute of Electrical and Electronics Engineers, Inc., New York, NY, USA.

Information technology—Telecommunications and information exchange between systems—Local and metropolitan area networks—Specific requirements—Part 11: Wireless LAN Medium Access Control (MAC) and Physical Layer (PHY) specifications: Amendment 6: Medium Access Control (MAC) Security Enhancements, ANSI/IEEE Std 802.11i, 2004, Institute of Electrical and Electronics Engineers, Inc., New York, NY, USA.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, ANSI/IEEE Std 802.11a, 2004, Institute of Electrical Engineers, Inc., New York, NY, USA.

Patent Cooperation Treaty (PCT) International Search Report and Written Opinion, for co-pending PCT International Application No. PCT/US2010/037706, International Filing Date Jun. 8, 2010 having a date of mailing of Jan. 25, 2011 (12 pgs).

* cited by examiner

Prior Art Figure 1

GENERATING SECURITY MATERIAL

CROSS REFERENCE TO RELATED APPLICATIONS

This application claims the benefit of (i) U.S. Provisional Application Ser. No. 61/219,928 filed Jun. 24, 2009, which is hereby wholly incorporated by reference, and (ii) of U.S. Provisional Application Ser. No. 61/223,974 filed Jul. 8, 2009, which is also hereby wholly incorporated by reference.

BACKGROUND

Networks can be arranged in a star topology. A star topology allowed a central actor(s) (e.g., access point (AP), authentication/authorization/accounting (AAA) server) to facilitate key generation and distribution. Networks can also be arranged in other topologies (e.g., a mesh). A mesh topology typically employs distributed techniques that do not rely on a single central actor to establish and generate keys. However, such techniques are computationally intensive and generally require, for example, on the order of $O(N^2)$ communications for key distribution, where N is an integer that represents the number of stations in the mesh topology.

Emerging topologies (e.g., piconet basic server set (PBSS)) that include a central secret holder/provider, that allow secure, direct, station-to-station communications and that allow secure station (STA) to station broadcast communications have faced challenges finding appropriate key generation and distribution techniques.

In a conventional star topology, only a single broadcast key is required because all broadcast messages transit (or pass through) the access point. In a PBSS, where stations may broadcast without using a central actor (e.g., PBSS control point (PCP)), multiple broadcast keys may be required, thereby complicating issues associated with key generation and distribution. Additionally, in a conventional star topology, even station-to-station communications pass through the access point. In a PBSS, station-to-station communications can occur directly, without passing through a hub (e.g., AP, PCP). Once again this complicates pair-wise key generation and distribution issues.

Conventionally 802.11 networks have two basic modes of operation: an ad hoc mode, and an infrastructure mode. In the ad hoc mode, peers engage in peer to peer (P2P) communications with no AP access. The peers use an independent basic service set (IBSS) to support the P2P (a.k.a. station-to-station (S2S)) communications. In infrastructure mode, communicating stations rely on an AP.

Prior Art FIG. 1 illustrates a conventional 802.11 star topology including an access point (AP) 100, a first station STA1, a second station STA2, and an authentication, authorization, and accounting (AAA) server 110. When STA1 wants to have a secure communication with AP 100, then STA1 and AP 100 communicate with AAA server 110 to acquire copies of a pair-wise master key (PMK). The PMK can then serve as a shared secret from which STA1 and AP 100 can both compute pair-wise keys. For example, STA1 and AP 100 can compute a pair-wise transient key (PTK) as a function of the shared secret and some unique information communicated between STA1 and AP 100. The AAA server 110 may be, for example, a RADIUS server.

If STA2 also wants to have a secure communication with AP 100, then STA2 and AP 100 both communicate with AAA server 110 to acquire a different PMK and then compute a separate PTK based on this different PMK and different unique information communicated between STA2 and AP 100. If STA1 wants to have a secure communication with STA2 then in effect two separate pair-wise secure communications may occur, one between STA1 and AP 100 and one between STA2 and AP 100. The secured data that is communicated between STA1 and STA2 will transit the AP 100. In one configuration, STA1 and STA2 may have also acquired pair-wise keys that they use to secure communications that will transit AP 100. In one example, STA1 and STA2 may also use the pair-wise keys for direct secure communications between themselves without transiting the AP 100.

In the conventional topology illustrated in Prior Art FIG. 1, AP 100 may also generate a group-wise master key (GMK) and compute a group-wise transient key (GTK) based on the GMK for securing group (e.g., broadcast) communications. AP 100 may provide the GTK to STA1, STA2, and other members of the group to which the message will be broadcast. Thus, Prior Art FIG. 1 illustrates a conventional system where two stations that share a first secret (e.g., PMK) can each generate a second secret (e.g., PTK) as a function of the first secret and some unique information. The unique information can be shared using a conventional four-way handshake. Additionally Prior Art FIG. 1 illustrates a conventional system where a central actor can provide a broadcast key.

SUMMARY

In one embodiment, a method includes creating pair-wise unique material for a first member of a pair of communicating stations. The stations are part of a topology (e.g., PBSS) that includes a central secret holder/provider that allows secure, direct, station-to-station communications and that also allows secure station (STA) to station broadcast communications. Members of the pair of communicating stations will have already established a security association (SA) with a topology control point (PCP). Members of the pair of communicating stations will be establishing a secure, direct, station-to-station communication that will not transit (or pass through) the PCP. The pair-wise unique material is computed as a function of a known shared secret associated with the PCP, a first piece of unique data associated with the first member, and a second piece of unique data associated with a second member of the pair. The method also includes securely communicating the pair-wise unique material from the first member to the second member.

BRIEF DESCRIPTION OF THE DRAWINGS

The accompanying drawings, which are incorporated in and constitute a part of the specification, illustrate various examples of systems, methods, and other embodiments of various aspects of the invention. Element boundaries (e.g., boxes, groups of boxes, or other shapes) shown in the figures represent one example of the boundaries. In some examples one element may be designed as multiple elements or that multiple elements may be designed as one element. In some examples, an element shown as an internal component of another element may be implemented as an external component and vice versa. Furthermore, elements may not be drawn to scale.

Prior Art

DETAILED DESCRIPTION

The disclosure describes generating security material for pair-wise and group-wise communications in a hybrid networking topology that supports both secure station-to-station pair-wise communications and secure station-to-group group-wise communications. Example apparatuses and methods facilitate generating and distributing security material (e.g., pair-wise keys, group-wise keys) for a piconet basic service set (PBSS) having N members in a less than $O(N^2)$ order manner. While a PBSS is described, one skilled in the art will appreciate that example apparatuses and methods may also facilitate generating and distributing security material in, for example, tunneled direct link setup (TDLS) and/or independent basic service set (IBSS).

Figure 1:
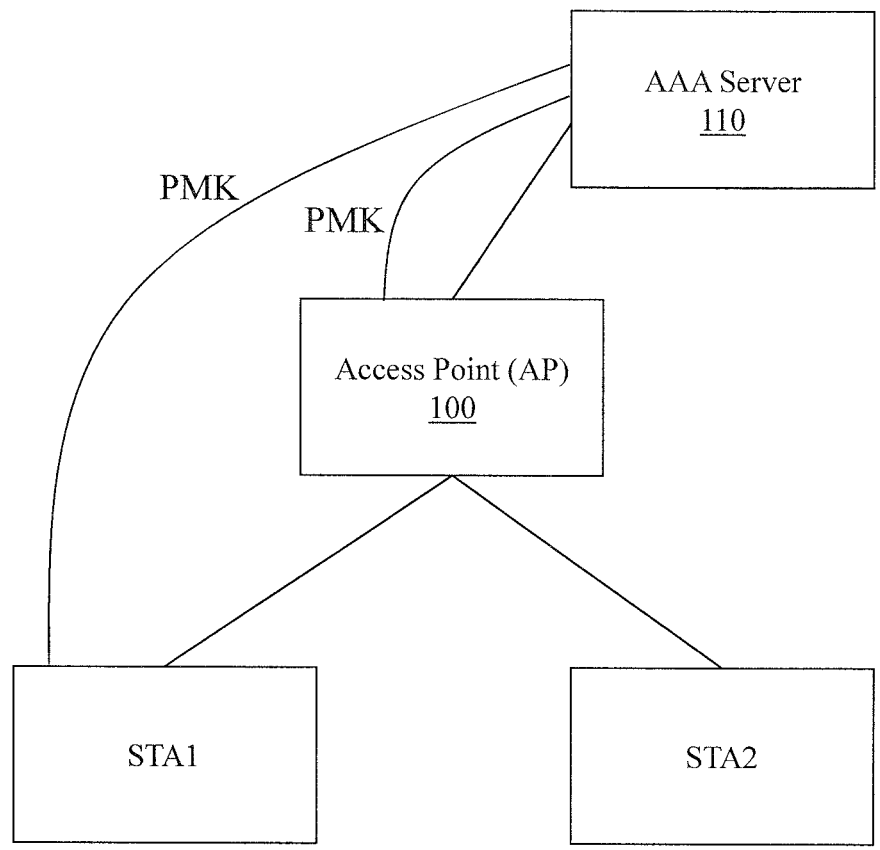
FIG. 1 illustrates a conventional 802.11 star topology.
Figure 2:
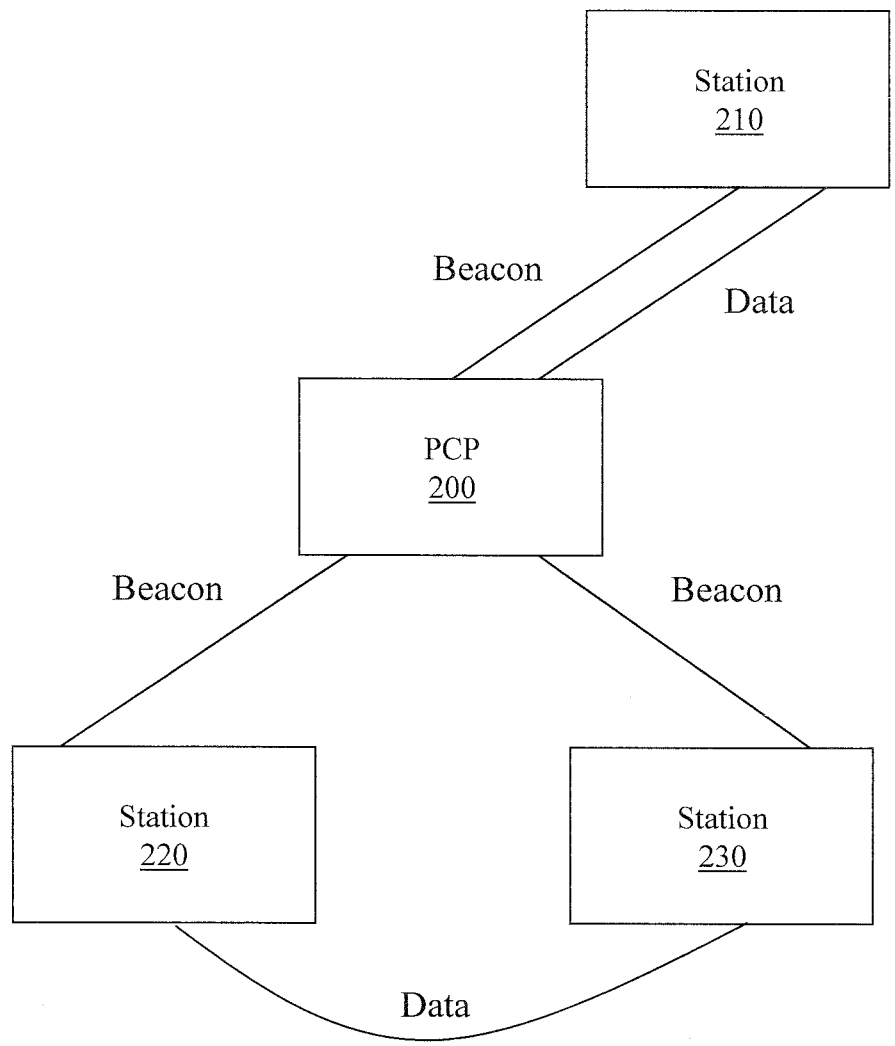
FIG. 2 illustrates a topology associated with a piconet basic service set (PBSS).

FIG. 2 illustrates a topology associated with a piconet basic service set (PBSS) that includes a PBSS control point (PCP) 200, a first station 210, a second station 220, and a third station 230. The PCP 200 is illustrated providing a beacon to the first station 210, the second station 220, and the third station 230. The beacon may provide, for example, timing information for coordinating communications. The PCP 200 and the first station 210 may communicate data similarly to how data may be communicated in a conventional 802.11 star topology. However, the second station 220 and the third station 230 may communicate data between each other without having the data transit the PCP 200. The communication may be facilitated by the beacon provided by the PCP 200.

A PBSS is a self-contained topology that includes a PCP. Only the PCP sends beacons. A station (STA) in a PBSS may or may not associate with the PCP. Pair-wise station-to-station communications that do not transit the PCP are allowed. Group-wise station-to-station communications that do not transit the PCP are also allowed. A station may or may not trust the PCP. There are three different security considerations for a PBSS: PCP to STA security, STA-to-STA security, and STA to group security. Example apparatuses and methods concern efficient key generation and distribution for STA-to-STA security and for group-wise STA to group communications. Example apparatus and methods compute unique pair-wise keys between pairs of stations. Example apparatus and methods also compute unique group-wise keys for stations. In one embodiment, station-to-station communications may require unique keys per instance of communication, and thus example apparatus and methods may compute unique pair-wise keys per instance of communication using temporally unique information (e.g., nonces) that may be provided, for example, by a PCP.

Figure 3:
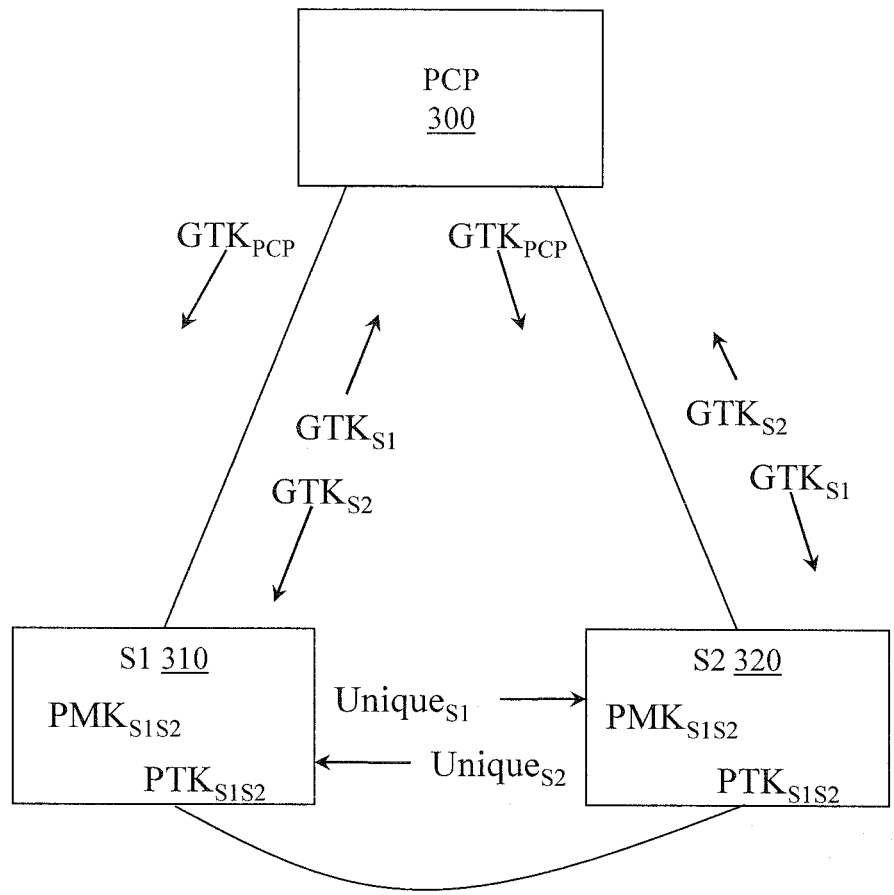
FIG. 3 illustrates keys associated with a PBSS.

FIG. 3 illustrates keys associated with a PBSS. The PBSS includes a PCP 300, a first station $S_1$ 310, and a second station $S_2$ 320. One skilled in the art will appreciate that a PBSS may include more than just two stations. PCP 300 may transmit security material (e.g., a group transient key ($GTK_{PCP}$)) to the stations. A station may then compute its own group-wise security material (e.g., $GTK_{S1}$, $GTK_{S2}$) using the $GTK_{PCP}$ and some material unique to the station (e.g., MAC address, nonce). Conventionally group-wise security materials may be transmitted back to the PCP 300 by the stations and then distributed out to other stations. For example, $GTK_{S1}$ may be computed at $S_1$ 310, provided to PCP 300, and then provided out to $S_2$ 320. Similarly, $GTK_{S2}$ may be computed at $S_2$ 320, provided to PCP 300, and then provided out to $S_1$ 310. This type of GTK distribution experiences significant overhead. To avoid this overhead, example systems and methods may employ a computation based GTK approach that does not experience the GTP distribution overhead. A pair of stations may also compute pair-wise security material (e.g., $PMK_{S1S2}$, $PTK_{S1S2}$) using the $GTK_{PCP}$ and some material unique to the stations (e.g., MAC addresses, nonces). Since both $S_1$ 310 and $S_2$ 320 will compute a GTK in the same manner, in an embodiment where a station computes its GTK based on its MAC address, a station that receives the GTK for another station will be able to verify that GTK when a message is received from that other station by recreating the GTK from the MAC address associated with the sending station.

Figure 4:
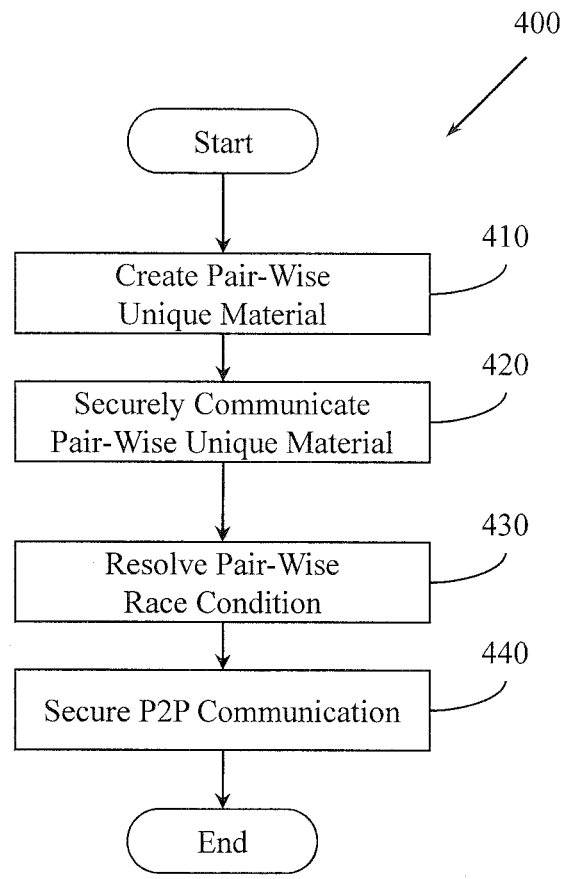
FIG. 4 illustrates a method associated with pair-wise key generation in a PBSS.

FIG. 4 illustrates a method 400 for computing pair-wise unique material. At 410, method 400 includes creating pair-wise unique material for a first station and a second station in a piconet basic service set (PBSS). While a PBSS is described, one skilled in the art will appreciate that more generally pair-wise unique material may be created for a station in a network topology that includes a central secret holder and that allows peer to peer communications that do not transit that central secret holder. The communicating stations will have already established a security association (SA) with a PBSS control point (PCP) and thus will be trusted with shared secret material. The pair of communicating stations want pair-wise unique material to secure a direct, station-to-station communication that will not transit the PCP.

In one example, the pair-wise unique material is computed as a function of secret material and unique material. The unique material may be computed from a known shared secret associated with the PCP, a first piece of unique data associated with the first member, and/or a second piece of unique data associated with a second member of the pair. In one example, the known shared secret is a group transient key (GTK) provided by the PCP. The first piece of unique data may be, for example, a media access control (MAC) address associated with the first member, and/or a nonce known to the first member. The nonce may have been provided in a beacon or other communication from the PCP. Similarly, the second piece of unique data may be, for example, a MAC address associated with the second member and/or a nonce known to the second member.

In one example, if pairwise nonces are required, it may be necessary to communicate the first piece of unique data to the second station and to communicate the second piece of unique data to the first station. In another example, if MAC addresses are used, the communication and exchange is not required. In one embodiment, the first piece of unique data and the second piece of unique data are communicated between the stations using an extensible authentication protocol over local area network (EAPoL) four-way handshake. One skilled in the art will appreciate that there are other secure ways to communicate this type of information.

At 420, method 400 includes securely communicating the pair-wise unique material from the first station to the second station. Once again, the pair-wise security material may be communicated using, for example, an EAPoL four-way handshake.

At 430, one embodiment of method 400 includes selectively resolving a first message race condition associated with colliding EAPoL four-way handshake establishment attempts by the first station and the second station. In one embodiment, the collision may be resolved using the MAC address of the first station and the second station. For example, a message associated with a higher addressed station may be kept while a message associated with a lower addressed station may be dropped.

At 440, method 400 includes securing a communication from the first station to the second station using the pair-wise unique material. Note that the communication between the first station and the second station will not transit the PCP. Securing the communication may include encrypting a portion of a message using the pair-wise unique material.

Figure 5:
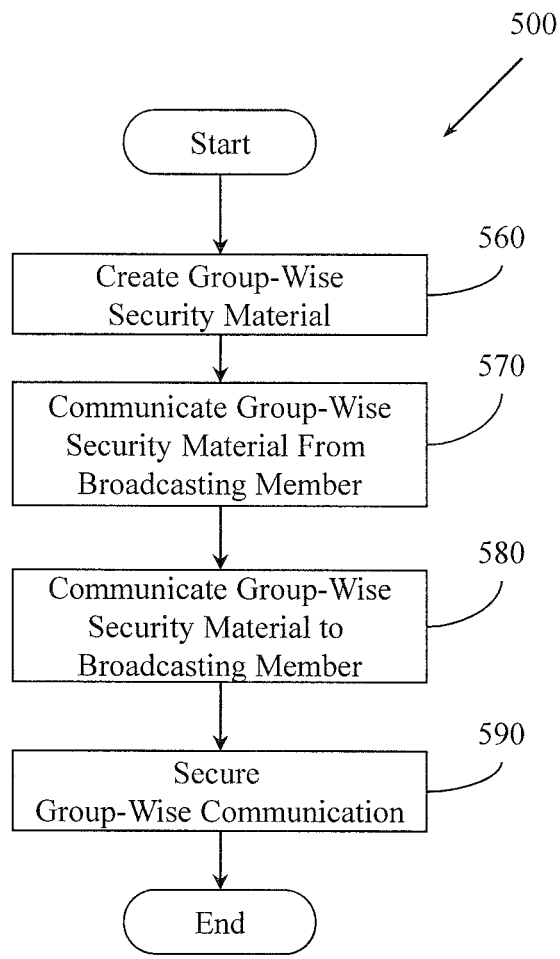
FIG. 5 illustrates a method associated with group-wise key generation in a PBSS.

FIG. 5 illustrates a method 500 associated with creating and distributing group-wise security material. At 560, method 500 includes creating group-wise security material for a broadcasting member of a piconet basic service set (PBSS). More generally, one skilled in the art will appreciate that the broadcasting member may be a member of a network topology that includes a central secret holder and that allows peer to peer broadcasting. To have access to secret material available from the PBSS control point (PCP), the broadcasting member will have already established a security association (SA) with the PCP. The broadcasting member seeks to have group-wise security material because the broadcasting member wants to securely transmit a message (e.g., broadcast, multicast) to one or more other members of the PBSS without having the message transit the PCP. Thus, the broadcasting member will be transmitting a message to a group without having the message transit the PCP, making the message a peer-to-peer broadcast message.

The group-wise security material is computed as a function of a known secret associated with the PCP and a piece of unique data associated with the broadcasting member. In one example, the known secret is a group transient key (GTK) provided by the PCP. The piece of unique data may be, for example, a media access control (MAC) address associated with the broadcasting member and/or a nonce known to the broadcasting member. The nonce may have been provided by the PCP.

At 570, method 500 includes securely communicating the group-wise security material. Thus, after computing its group-wise material, the broadcasting member may make that group-wise material available to another PBSS member. To allow both the PCP and the broadcasting member to have the same information involved in computing the group-wise security material, information may be transmitted between the broadcasting member and the PCP. The data communicated may include the piece of unique data and the group-wise security material. The data may be communicated using an extensible authentication protocol over local area network (EAPoL) four-way handshake.

At 580, method 500 includes communicating the group-wise security material from the PCP to other members of the PBSS and communicating group-wise security information associated with the one or more other members of the PBSS to the broadcasting member. Thus, after a broadcasting member establishes its group-wise material it may receive group-wise material established by other members of the PBSS.

At 590, method 500 includes securing a communication between the broadcasting member and the one or more other members of the PBSS using the group-wise security material. Securing the communication may include encrypting a portion of a message using the group-wise security material.

Figure 6:
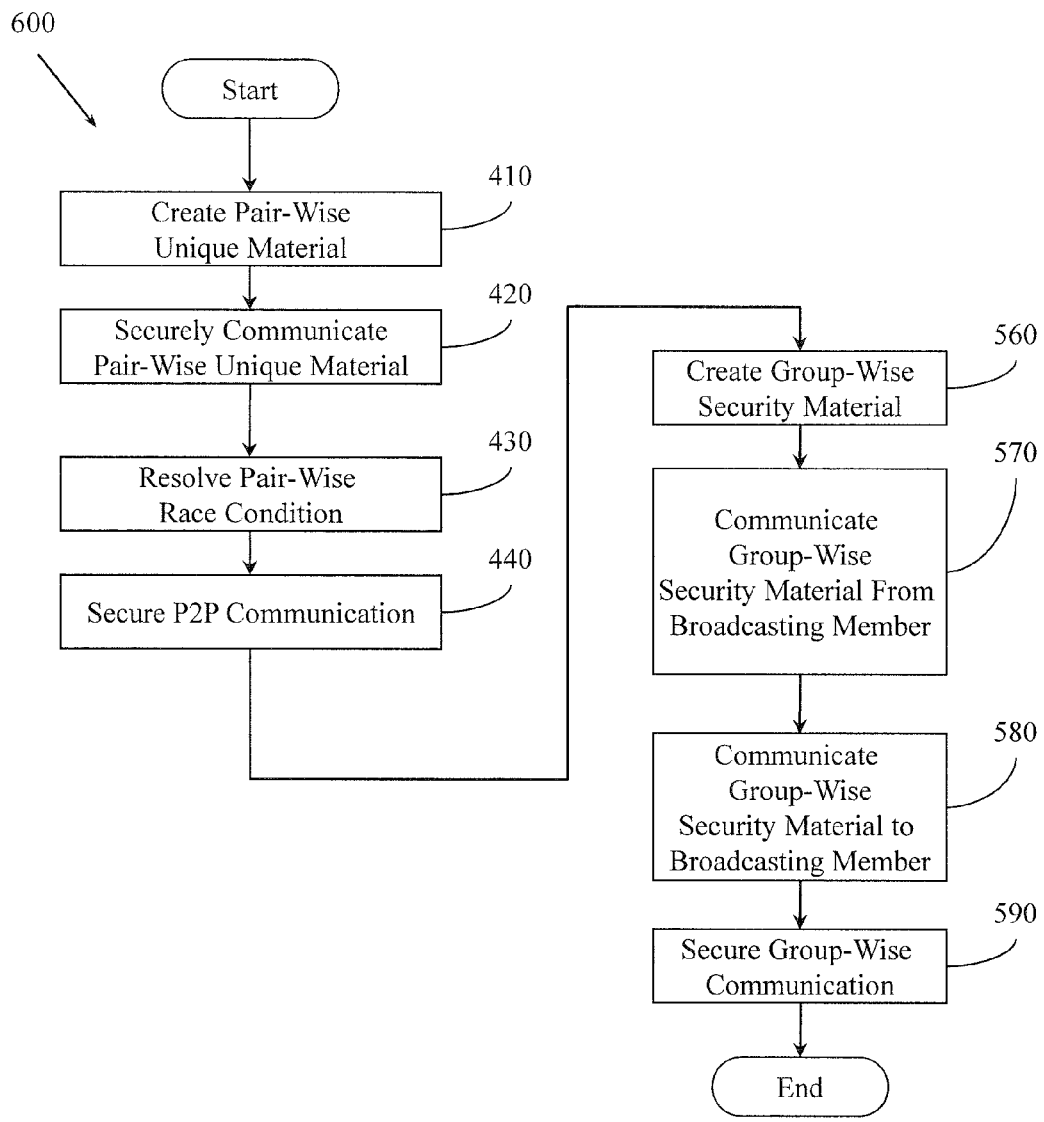
FIG. 6 illustrates a method associated with pair-wise and group-wise key generation in a PBSS.

FIG. 6 illustrates a method 600 that includes actions 410, 420, 430, and 440 from method 400 (FIG. 4) and actions 560, 570, 580, and 590 from method 500 (FIG. 5). Thus one skilled in the art will appreciate from the teachings herein that in one embodiment, method 600 may create and distribute both pair-wise security material and group-wise security material.

Example systems and methods therefore describe three different approaches. In a first approach, an STA generates its own GTK using its own GMK and a nonce. The STA then securely passes the GTK to other STAs either through the PCP or directly. When the information goes through the PCT, the STA uses PTK with the PCP. If the STA has direct PTK with another STA, then the STA can send the GTK directly to the other STA using the PTK with the other STA. In a second approach, an STA uses the GTK-PCP and a nonce to generate its own GTK. Since all STAs are assumed to know the GTK-PCP since they are associated with the PCP, the STA only needs to send its own nonce to other STAs. Once again the nonce can be sent either through the PCP or directly. Other STAs can compute the GTK based on the GTK-PCP and the received nonce. In a third approach, an STA uses the GTK-PCP and the STA's MAC address to generate its own GTK. In this case, the STA does not need to send anything to other STAs. The other STAs can simply calculate the STA's GTK based on the GTK-PCP and the STA's MAC address.

Figure 7:
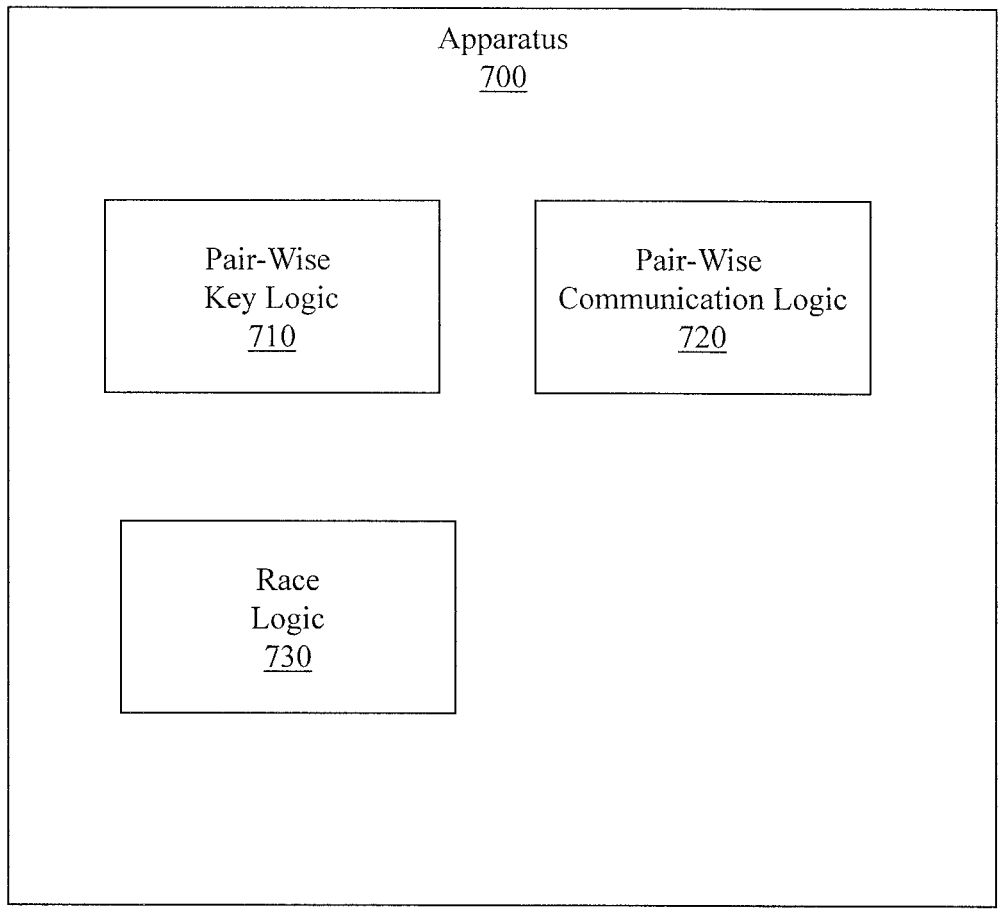
FIG. 7 illustrates an apparatus associated with pair-wise key generation in a PBSS.

FIG. 7 illustrates an apparatus 700. Apparatus 700 includes a pair-wise key logic 710 and a pair-wise communication logic 720. The pair-wise key logic 710 is configured to compute a pair-wise transient key (PTK) for a first member ($S_i$) of a piconet basic service set (PBSS) that wants to have a secure pair-wise communication with a second member ($S_j$) of the PBSS. $S_i$ and $S_j$ will have already established a security association (SA) with a PBSS control point (PCP). The secure, station-to-station communication between $S_i$ and $S_j$ will not transit the PCP. More generally, pair-wise key logic 710 may be configured to compute a pair-wise security material for a member of a pair of stations that are members of a topology having a shared secret holder and that want to have a secure, direct, station-to-station communication.

In one example, the pair-wise key logic 710 computes the PTK according to:

$$PTK_{ij} = f(GTK_{PCP}, Unique_{SI}, Unique_{SJ})$$

where $GTK_{PCP}$ is a group transient key generated by the PCP, where $Unique_{SI}$ is information unique to $S_i$ and where $Unique_{SJ}$ is information unique to $S_j$. In one example, $Unique_{SI}$ is a media access control (MAC) address associated with $S_i$. $Unique_{SJ}$ may also be, for example, a MAC address associated with $S_j$.

In another embodiment, $PTK_{ij}$ is computed according to:

$$PTK_{ij} = f(GTK_{PCP}, Unique_{SI}, Unique_{SJ}, \text{additional parameters})$$

where the additional parameters are based, at least in part, on beacon information provided by the PCP. The additional parameters may be, for example, nonces provided to apparatus 700 by a PCP.

Apparatus 700 also includes pair-wise communication logic 720. Pair-wise communication logic 720 secures a communication from $S_i$ to $S_j$ using $PTK_{ij}$. Securing the communication may include, for example, encrypting the communication. Pair-wise communication logic 720 may also securely communicate $Unique_{SI}$ and $Unique_{SJ}$ between $S_i$ and $S_j$. In some examples, $Unique_{SI}$ and $Unique_{SJ}$ may not need to be communicated. If the communication is required, then the unique data may be communicated between $S_i$ and $S_j$ using an extensible authentication protocol over local area network (EAPoL) four-way handshake. While an EAPoL four-way handshake is described, one skilled in the art of computer network security will appreciate that other communication techniques may be employed.

In one embodiment, apparatus 700 may also include race logic 730. Race logic 730 may be configured to resolve a race condition associated with communicating security material and/or unique data from which security material can be computed. Both $S_i$ and $S_j$ may be trying to compute pair-wise security material. Therefore both $S_i$ and $S_j$ may initiate a four-way handshake to communicate information. The race condition concerns the first message of the EAPoL four-way handshake establishment attempts by $S_i$ and $S_j$. In one example, race logic 730 may resolve the race condition based on the MAC address of $S_i$ and $S_j$. For example, $S_i$ may receive a first message in a four-way handshake from $S_j$ just after it sent a first message in a four-way handshake to $S_j$. $S_i$ may look at its own MAC address and look at the MAC address for $S_j$. $S_i$ may decide to ignore the first message from $S_j$ because $S_i$ has a higher MAC address. If $S_j$ is operating under the same protocol, which is likely because both $S_i$ and $S_j$ will have already established an SA with the PCP, then $S_j$ will take a similar action of accepting the first message from $S_i$ while abandoning its attempted four-way handshake with $S_i$ upon determining that $S_j$ has a lower MAC address than $S_i$. One skilled in the art will appreciate that other MAC address based resolution (e.g., keep lower addressed messages) techniques may be employed.

Figure 8:
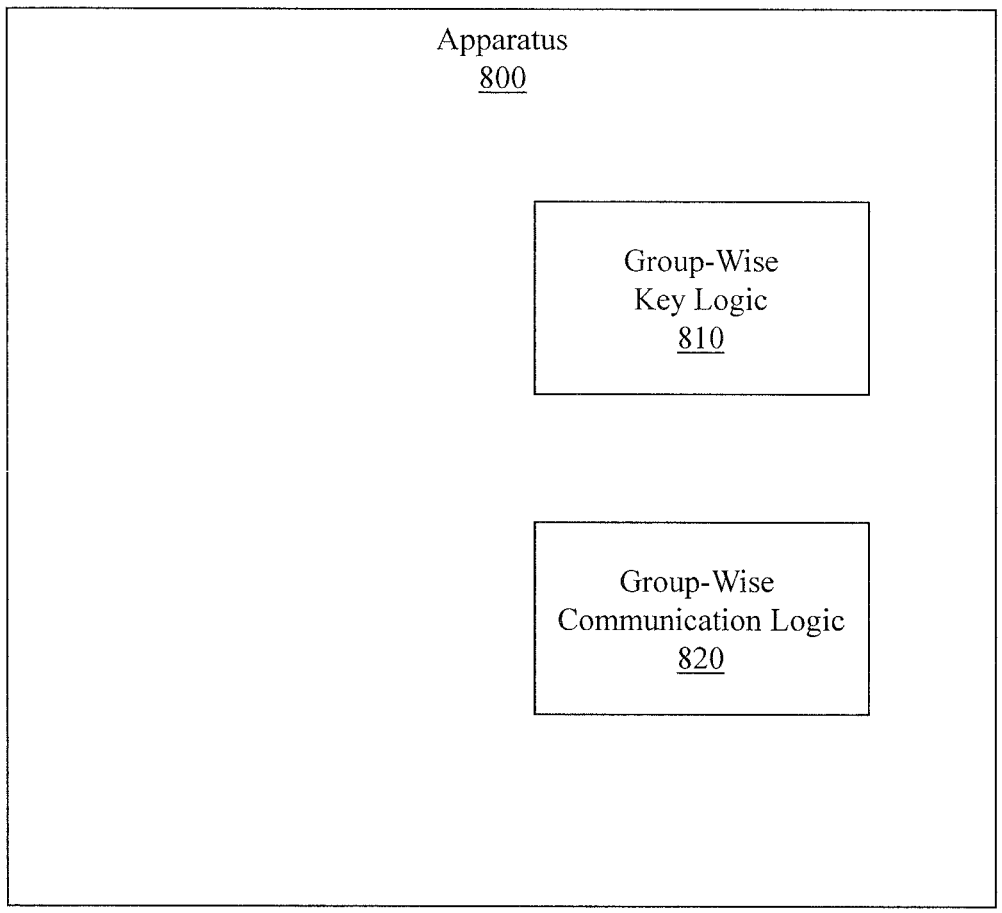
FIG. 8 illustrates an apparatus associated with group-wise key generation in a PBSS.

FIG. 8 illustrates an apparatus 800. Apparatus 800 includes a group-wise key logic 810 and a group-wise communication logic 820. Group-wise key logic 810 is configured to compute, for a broadcasting member $S_B$ of a piconet basic service set (PBSS), a group-wise transient key ($GTK_B$). $S_B$ will have already established a security association (SA) with a PBSS control point (PCP). $S_B$ is computing the group-wise security information so that $S_b$ can perform a secure, station-to-station communication that does not transit the PCP. The secure, station-to-station communication will involve one or more other members of the BSS. For example, the secure, station-to-station communication will be a broadcast or multicast message. In one example, group-wise key logic 810 computes $GTK_B$ according to:

$$GTK_B = f(GTK_{PCP}, Unique_{SB})$$

where $GTK_B$ is a group transient key generated by the PCP, and where $Unique_{SB}$ is information unique to $S_B$.

$Unique_{SB}$ may be, for example, a media access control (MAC) address associated with $S_B$, a nonce provided by the PCP, and other information.

Apparatus 800 also includes group-wise communication logic 820. Group-wise communication logic 820 secures communications from $S_B$ to the one or more other members of the PBSS using $GTK_B$. Securing the communications may include, for example, encrypting the communications.

In one example, the group-wise communication logic 820 securely communicates $Unique_{SB}$ and $GTK_{SB}$ to the PCP using an extensible authentication protocol over local area network (EAPoL) four-way handshake. The group-wise communication logic 820 may signal the PCP to selectively distribute the $GTK_{SB}$ to one or more members of the PBSS. This facilitates getting group-wise information from $S_B$ to other members. The group-wise communication logic 820 may also signal the PCP to selectively distribute group transient keys associated with other members of the PBSS to $S_B$. This facilitates getting group-wise information from other members to $S_B$.

Figure 9:
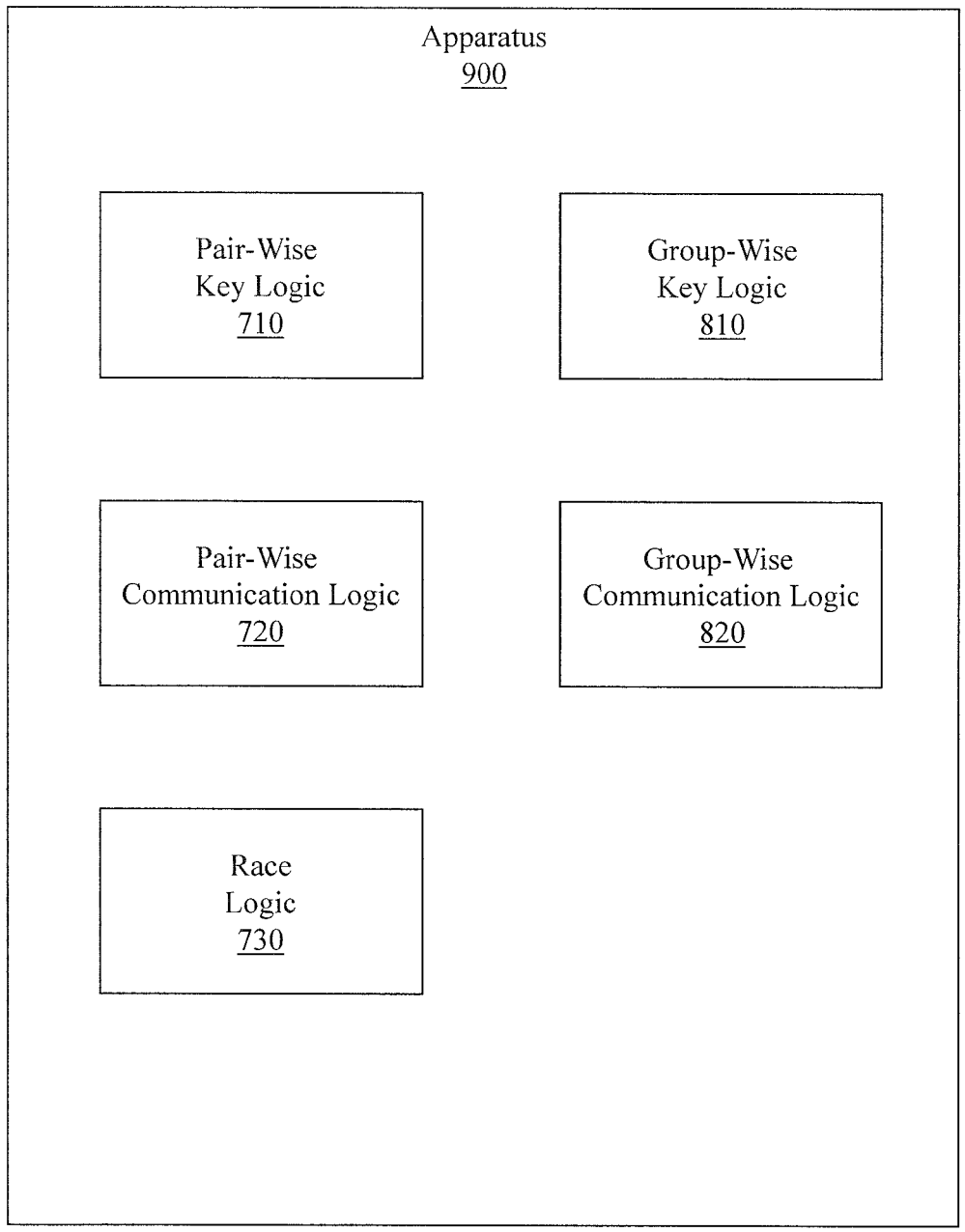
FIG. 9 illustrates an apparatus associated with pair-wise and group-wise key generation in a PBSS.

FIG. 9 illustrates an apparatus 900. Apparatus 900 includes elements 710, 720, and 730 from apparatus 700 and elements 810 and 820 from apparatus 800. Thus, one skilled in the art will appreciate from the teachings herein that apparatus 900 can generate and distribute both pair-wise and group-wise keys. In one example of apparatus 900, pair-wise key logic 710 and group-wise key logic 810 are configured to generate and distribute pair-wise keys and group-wise keys for a PBSS having N members in a less than $O(N^2)$ order manner.

To the extent that the term "includes" or "including" is employed in the detailed description or the claims, it is intended to be inclusive in a manner similar to the term "comprising" as that term is interpreted when employed as a transitional word in a claim.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware stored in a memory, software stored on a storage medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement a methodology. Blocks may be combined or separated into multiple components. Furthermore, additional and/or alternative methodologies can employ additional, not illustrated blocks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method for establishing a secure, direct, station-to-station communication between a first station and a second station, the method comprising:
creating pair-wise unique material for the first station, wherein the pair-wise unique material is computed as a function of (i) a known shared secret associated with a piconet basic service set control point (PCP), (ii) a first piece of unique data associated with the first station, and (iii) a second piece of unique data associated with the second station;
securely communicating the pair-wise unique material from the first station to the second station, wherein the first station and the second station independently authenticate with the PCP prior to communicating to establish a security association (SA) with the PCP, and wherein the known shared secret is a group transient key (GTK) of the PCP,
wherein the first station and the second station are members of a group of stations associated with the PCP, wherein the PCP is an access point and the group of stations are peer devices that are not access points;
communicating, by the first station, directly via peer-to-peer communications with the second station using the pair-wise unique material to secure the peer-to-peer communications;
broadcasting, by the first station, a communication to the group of stations using at least the GTK from the PCP to secure the communication, wherein communicating directly and broadcasting includes communicating without messages transiting the PCP; and
in response to a race condition associated with colliding messages of a four-way handshake between the first station and the second station, selectively resolving the race condition based on a media access control (MAC) address of the first station and a MAC address of the second station or another unique identifier of the first station and the second station.

2. The method of claim 1, wherein:
the known shared secret is the group transient key (GTK) that is derived by the PCP from a master key, the first piece of unique data is the MAC address associated with the first station, or a nonce, and the second piece of unique data is the MAC address associated with the second station or a nonce.

3. The method of claim 2, further comprising using an extensible authentication protocol over local area network (EAPoL) four-way handshake to communicate the first piece of unique data and the second piece of unique data between the first station and the second station.

4. The method of claim 3, further comprising:
securing a communication between the first station and the second station using the pair-wise unique material.

5. The method of claim 1, further comprising:
creating group-wise security material for the first station that is broadcasting communications, wherein the first station has established an SA with the PCP, and wherein the first station is to securely transmit a message to two or more stations in the group of stations, the group-wise security material being computed as a function of (i) the known shared secret associated with the PCP and (ii) a piece of unique data associated with the first station; and
securely communicating the group-wise security material from the first station to the two or more stations of the group of stations, wherein the first piece of unique data is the MAC address of the first station or a nonce, and wherein the second piece of unique data is the MAC address the second station or a nonce.

6. An apparatus for computing a pair-wise transient key for a first station ($S_i$) and a second station ($S_j$) of a piconent basic service set (PBSS), the apparatus comprising:
pair-wise key logic, including at least hardware, configured to compute a pair-wise transient key as a function of a $GTK_{PCP}$ that is a group transient key generated by a PBSS control point (PCP), a $Unique_{Si}$ that is information unique to the first station ($S_i$) and a $Unique_{Sj}$ that is information unique to the second station ($S_j$); and
pair-wise communication logic, including at least hardware, configured to securely communicate the pair-wise transient key between the first station and the second station, wherein the first station and the second station independently authenticate with the PCP prior to communicating to establish a security association (SA) with the PCP,
wherein the first station and the second station are members of a group of stations associated with the PCP, wherein the PCP is an access point and the group of stations are peer devices that are not access points,
wherein the pair-wise communication logic is configured to communicate directly via peer-to-peer communications with the second station using the pair-wise transient key to secure the peer-to-peer communications;
group-wise communication logic configured to broadcast a communication to the group of stations using at least the group transient key from the PCP to secure the communication, wherein the pair wise communication logic and the group-wise communication logic are configured to communicate with stations in the group of stations without communicating via the PCP; and
race logic configured to resolve a first message race condition associated with colliding four-way handshake attempts by the first station and the second station based on a media access control (MAC) address of the first station and a MAC address of the second station.

7. The apparatus of claim 6, wherein the $GTK_{PCP}$ is separately provided by the PCP to the first station and the second station, wherein the $GTK_{PCP}$ is derived by the PCP from a master key, wherein the $Unique_{Si}$ is the MAC address associated with the first station or a nonce, and wherein the $Unique_{Sj}$ is the MAC address associated with the second station or a nonce.

8. The apparatus of claim 7, wherein the pair-wise communication logic securely communicates the Unique and the Unique between the first station and the second station using an extensible authentication protocol over local area network (EAPoL) four-way handshake.

9. The apparatus of claim 7, further comprising: computing the pair-wise transient key using additional parameters that are based, at least in part, on beacon information provided by the PCP.

10. The apparatus of claim 6, further comprising:
group-wise key logic to compute, for a broadcasting member $S_B$ of the group of stations, a group-wise transient key ($GTK_B$), where $S_B$ has previously established an SA with the PCP, and where $S_B$ is to perform a secure, station-to-station communication that does not transit the PCP, where the secure, station-to-station communication involves one or more other members of the group of stations, wherein the $GTK_B$ is computed according to:

$$GTK_B = f(GTK_{PCP}, Unique_{SB})$$

wherein $GTK_{PCP}$ is a group transient key generated by the PCP, and wherein $Unique_{SB}$ is information unique to $S_B$; and group-wise communication logic to securely communicate $GTK_B$ from $S_B$ to the one or more other members of the group of stations.

11. An apparatus, comprising:

pair-wise key logic, including at least hardware, configured to create pair-wise unique material for a first station, wherein the first station and a second station have previously established a security association (SA) with a topology control point (PCP), wherein the pair-wise unique material is computed as a function of (i) a known shared secret associated with the PCP, (ii) a first piece of unique data associated with the first station, and (iii) a second piece of unique data associated with the second station;

pair-wise communication logic, including at least hardware, configured to securely communicate the pair-wise unique material from the first station to the second station, wherein the first station and the second station independently authenticate with the PCP prior to communicating to establish the SA, wherein the known shared secret is a group transient key (GTK) of the PCP, wherein the first station and the second station are members of a group of stations associated with the PCP, wherein the PCP is an access point and the group of stations are peer devices that are not access points, and wherein the pair-wise communication logic is configured to communicate directly via peer-to-peer communications with the second station using the pair-wise unique material to secure the peer-to-peer communications;

group-wise communication logic configured to broadcast a communication to the group of stations using at least the group transient key from the PCP to secure the communication, wherein the pair wise communication logic and the group-wise communication logic are configured to communicate with stations in the group of stations without communicating via the PCP; and race logic configured to resolve a first message race condition associated with colliding four-way handshake attempts by the first station and the second station based on a media access control (MAC) address of the first station and a MAC address of the second station.

* * * * *